United States Patent
Onishi

(10) Patent No.: US 8,934,152 B2
(45) Date of Patent: Jan. 13, 2015

(54) RECORDING APPARATUS

(71) Applicant: Seiko Epson Corporation, Tokyo (JP)

(72) Inventor: Ryoichi Onishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/220,393

(22) Filed: Mar. 20, 2014

(65) Prior Publication Data

US 2014/0293373 A1    Oct. 2, 2014

(30) Foreign Application Priority Data

Mar. 26, 2013   (JP) .................................. 2013-063312

(51) Int. Cl.
*H04N 1/04* (2006.01)
*H04N 1/10* (2006.01)

(52) U.S. Cl.
CPC ............. *H04N 1/103* (2013.01); *H04N 1/1061* (2013.01)
USPC ........... 358/474; 358/497; 358/486; 399/119; 271/265.01; 382/107

(58) Field of Classification Search
CPC ........... G02B 6/0081; G03G 15/04036; G03G 15/04054; G03G 15/326; G03G 2215/0409; H04N 1/02815; H04N 1/02855; H04N 1/1013; H04N 2201/02435; H04N 2201/02485
USPC ..................... 358/497, 482, 498, 475, 496; 271/265.01, 18, 273, 3.14, 3.2; 399/119, 18, 388; 382/107
See application file for complete search history.

(56) References Cited

U.S. PATENT DOCUMENTS

| | | | | | |
|---|---|---|---|---|---|
| 4,005,257 | A | * | 1/1977 | Krallinger et al. | 358/409 |
| 4,768,100 | A | * | 8/1988 | Kunishima et al. | 358/498 |
| 5,870,117 | A | * | 2/1999 | Moore | 347/37 |
| 6,075,624 | A | * | 6/2000 | Bannai et al. | 358/498 |
| 6,139,206 | A | * | 10/2000 | Ahn | 400/323 |
| 6,252,684 | B1 | * | 6/2001 | Lin | 358/498 |
| 6,736,502 | B2 | * | 5/2004 | Deguchi | 347/108 |
| 8,109,585 | B2 | * | 2/2012 | Iwakura | 347/8 |
| 8,414,105 | B2 | * | 4/2013 | Komuro et al. | 347/37 |
| 8,562,096 | B2 | * | 10/2013 | Kimura et al. | 347/14 |

FOREIGN PATENT DOCUMENTS

| JP | 2002-002054 | 1/2002 |
|---|---|---|
| JP | 2012-055990 | 3/2012 |
| JP | 2012-210781 | 11/2012 |

* cited by examiner

*Primary Examiner* — Negussie Worku
(74) *Attorney, Agent, or Firm* — Workman Nydegger

(57) ABSTRACT

A recording apparatus includes a recording processing unit that crosses a supporting stage; and a Y axis movement unit that causes the recording processing unit to move. The Y axis movement unit includes a guide rail of a reference side and a guide rail of a following side that support the recording processing unit to be free sliding; a first rail attachment base, which is fixed to the supporting stage, and to which the guide rail of the reference side is attached; and a second rail attachment base, which is fixed to the supporting stage, and to which the guide rail of the following side is attached. The first rail attachment base includes an attachment reference portion, and the load that the first rail attachment base receives from the recording processing unit is greater than that received by the second rail attachment base.

7 Claims, 8 Drawing Sheets

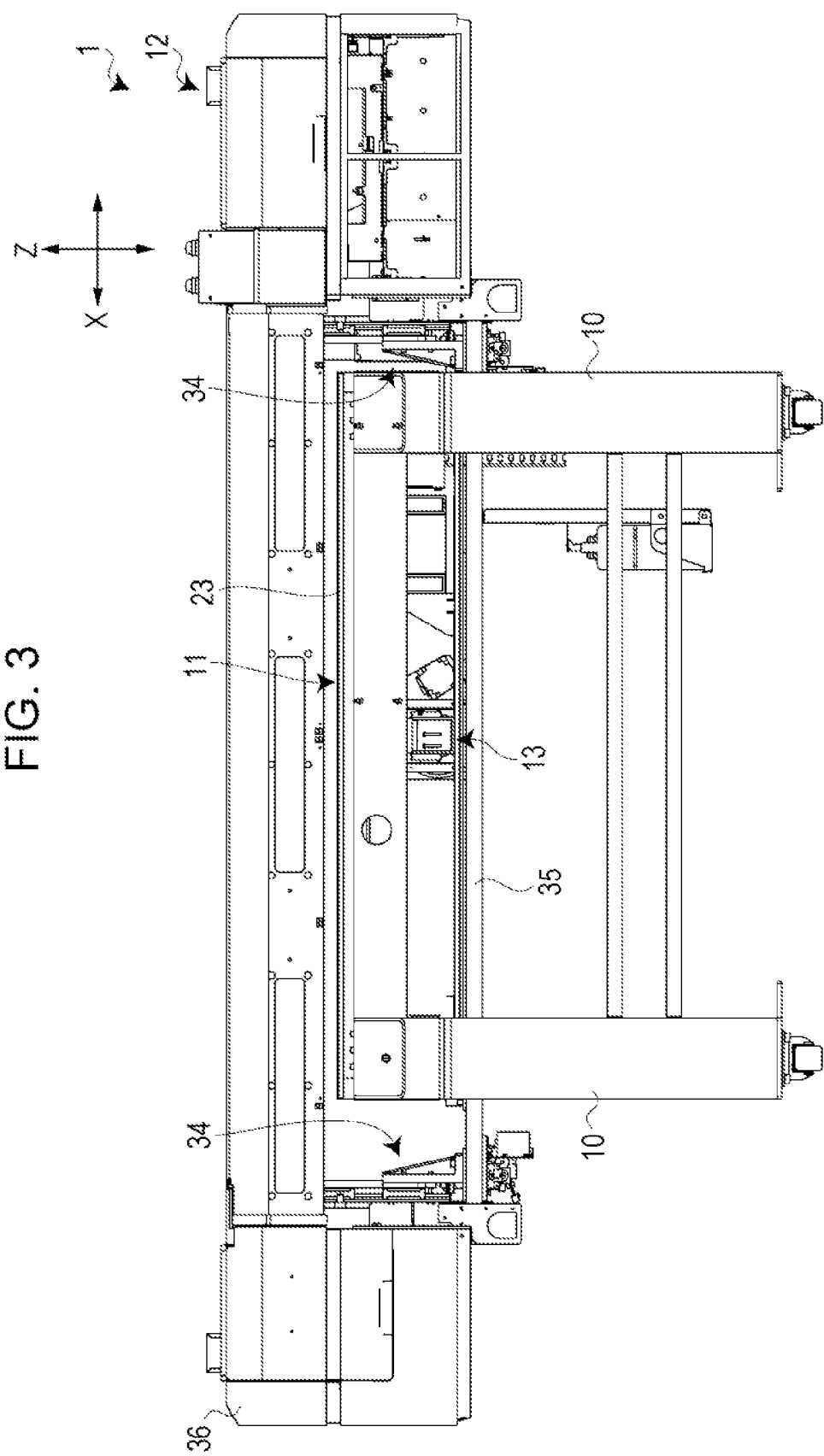

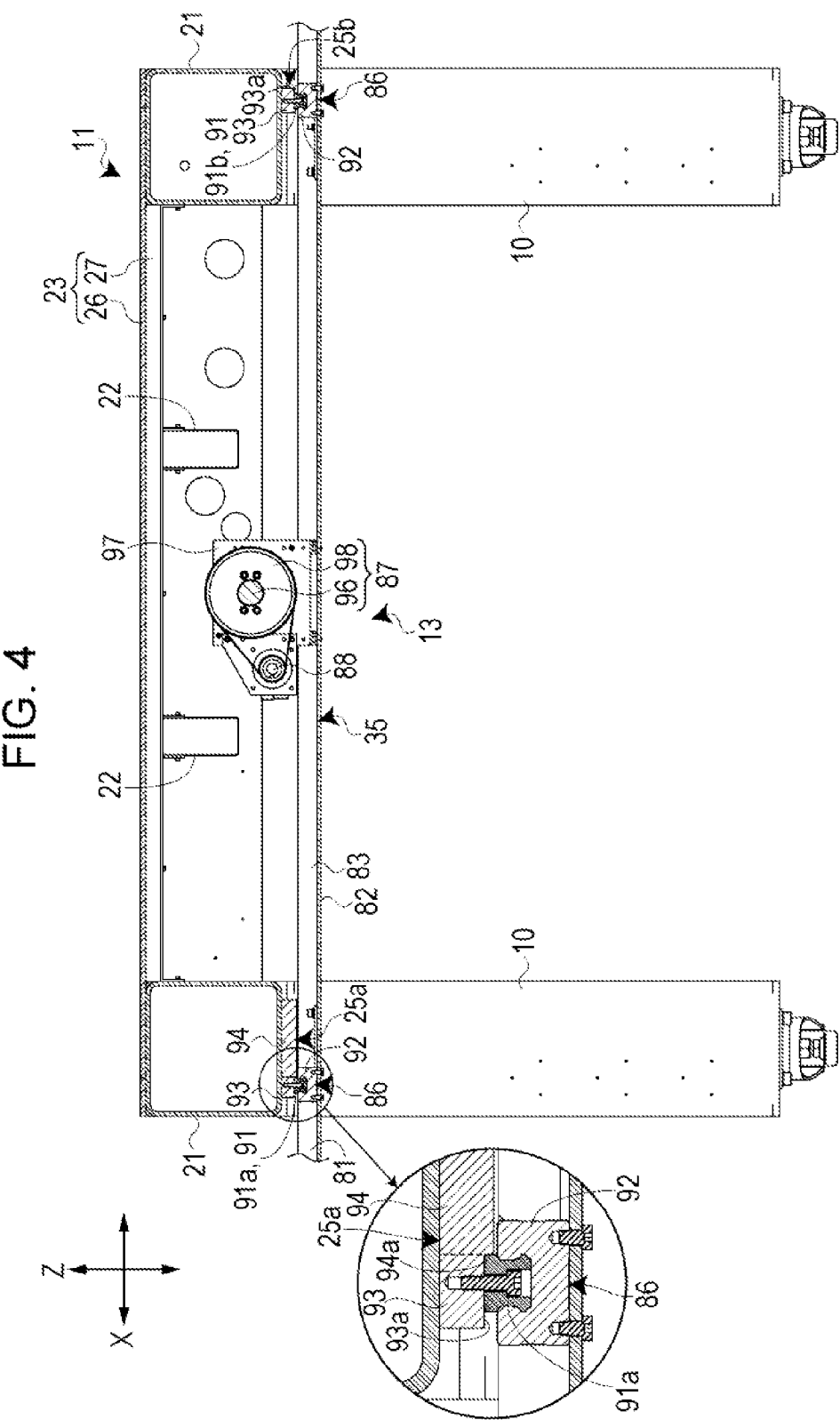

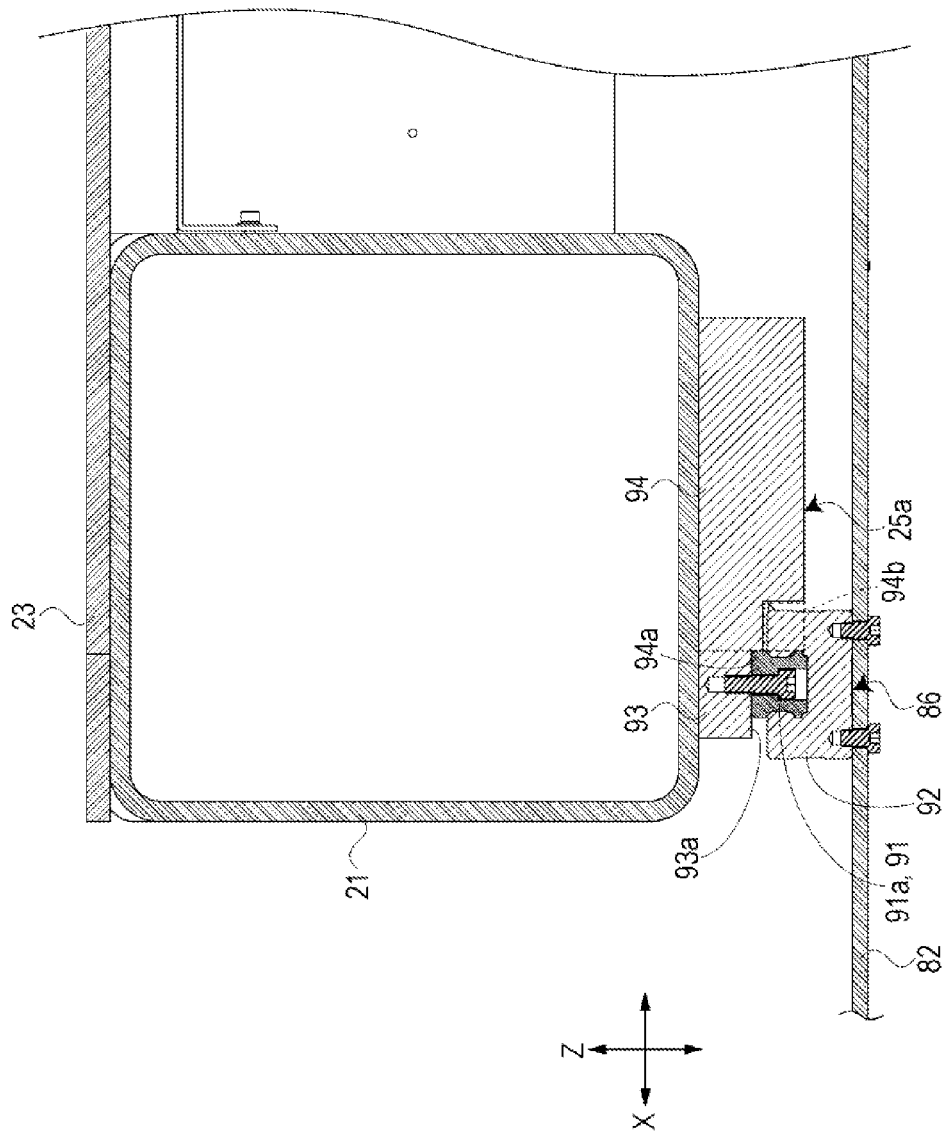

RECORDING APPARATUS

BACKGROUND

1. Technical Field

The present invention relates to a so-called flatbed type recording apparatus, in which a recording unit moves, and performs recording on a recording medium on a stage.

2. Related Art

In the related art, a known example of this type of recording apparatus is provided with a stage portion that supports a recording medium, a recording unit that opposes the stage portion, a Y bar (a Y axis supporting member) that supports the recording unit to be reciprocally movable in a main scanning direction (a Y axis direction), a pair of supporting columns that support both end portions of the Y bar, and X axis movement mechanisms that are connected to each of the supporting columns and cause the recording unit to move in a sub-scanning direction (an X axis direction) via each of the supporting columns and the Y bar, (refer to JP-A-2012-210781). The X axis movement mechanisms are disposed on a pair of left and right X axis frames that are provided on both sides of the stage portion in the width direction, and each of the X axis movement mechanisms includes an X axis guide rail that is provided on the X axis frame to extend in the X axis direction, an X axis linear movement guide that is connected to the X axis guide rail in a free sliding manner, and a slider that is connected to the supporting column and fixed to the X axis linear movement guide. Furthermore, the X axis frame is configured by a structural bar and a rail attachment base which is disposed on the structural bar and onto which the X axis guide rail is attached.

However, in this type of recording apparatus, due to structural problems, there is a case in which the distributed load of the movable body (the recording unit, the Y bar and the supporting columns) that moves in the X axis direction differs between the left and the right.

To counter this, in the configuration of the related art, since a configuration is adopted in which the movable body is supported by a pair of left and right structural bars, which configure a pair of X axis frames, a difference arises in the distributed load applied to the left and right structural bars, and there is a problem in that a difference arises in the amount of deflection of the left and right structural bars due to this difference. Thus, according to the difference in the amount of deflection, either the left or the right side of the movable body becomes inclined in a sinking manner. As a result, there is a problem in that flaws such as the recording unit becoming inclined occur and the print quality decreases.

SUMMARY

An advantage of some aspects of the invention is that it provides a recording apparatus, in which it is possible to suppress the inclination of the recording processing unit caused by a load of the recording processing unit using a simple configuration.

According to an aspect of the invention, there is provided a recording apparatus that includes a stage, which includes a supporting surface that supports a recording medium; a recording processing unit, which includes a recording unit that performs recording on the supported recording medium, and bridges a first direction so as to cross the stage; and a movement unit, which causes the recording processing unit to move in relation to the stage in a second direction that is perpendicular to the first direction and is parallel to the supporting surface. The movement unit includes a first guide rail, which supports the recording processing unit to be free sliding in the second direction in relation to the stage; a second guide rail, which is provided separated from the first guide rail in the first direction, and supports the recording processing unit to be free sliding in the second direction in relation to the stage; a first rail attachment base, which includes a first attachment surface to which the first guide rail is attached, and is fixed to the stage; and a second rail attachment base, which includes a second attachment surface to which the second guide rail is attached, and is fixed to the stage. The first rail attachment base includes a reinforcement portion of a thickness that protrudes from the first attachment surface, and the load that the first rail attachment base receives from the recording processing unit is greater than that received by the second rail attachment base.

In this configuration, by providing the thick reinforcement portion on the rail attachment base (the first rail attachment base) of the side at which the load (the distributed load) of the recording processing unit is great, the rigidity of the stage of the side to which the rail attachment base is fixed is reinforced. Accordingly, in the stage, it is possible to suppress the amount of deflection of the side at which the distributed load is great; thus, it is possible to suppress the inclination of the recording processing unit caused by the load of the recording processing unit using a simple configuration. For example, since it is possible to increase the rigidity (the second moment of area) of the structural bar of the side at which the distributed load is great using the reinforcement portion, it is possible to suppress the amount of deflection of the structural bar of the side at which the distributed load is great. Accordingly, it is possible to suppress the difference in the amount of deflection of the left and right structural bars with a simple configuration, using the left and right structural bars that are the same as one another.

In this case, it is preferable that an attachment reference surface, which is a side surface attachment reference of the first guide rail, be formed on a side surface of the first attachment surface side of the reinforcement portion.

In this case, it is preferable that the first guide rail be the guide rail of a reference side, and that the second guide rail be the guide rail of a following side.

According to these configurations, it is possible to cause the reinforcement portion of the first rail attachment base to function as the attachment reference portion that includes the attachment reference surface. In other words, it is possible to configure the reinforcement portion that improves the rigidity by using a step portion, which is the attachment reference surface. It is not necessary to provide the reinforcement portion and the attachment reference portion separately, and it is possible to adopt a simple configuration for the rail attachment base.

On the other hand, it is preferable that the reinforcement portion be formed at a thickness or a width, or both, such that the amount of deflection of the stage caused by the load is the same at the first rail attachment base side and the second rail attachment base side.

In this configuration, in regard to the stage, it is possible to set the difference in the amount of deflection between the first rail attachment base side and the second rail attachment base side to zero.

In this case it is preferable that a notch portion be formed that is cut out of the reinforcement portion so as to avoid a slider that corresponds to the first guide rail.

In this configuration, by providing the notch portion, it is possible to avoid interference between the reinforcement portion and the slider while the reinforcement portion maintains a sufficient thickness.

It is preferable that the movement unit further include a drive unit that causes the recording processing unit to move in the second direction in relation to the stage, and that the first attachment surface of the first rail attachment base be disposed in a position in the first direction that is separated further from the drive unit than the reinforcement portion.

In this configuration, it is possible to dispose the first guide rail in a position that is as distanced from the drive unit as possible. Accordingly, it is possible to improve the movement accuracy of the recording unit.

It is preferable that the first guide rail, the second guide rail, the first rail attachment base, and the second rail attachment base be disposed on a rear surface side of the stage.

In this configuration, the pair of guide rails and the pair of rail attachment bases are disposed on the rear surface side of the stage; thus, it is possible to reduce the height dimension of the entire recording apparatus (the dimension of the direction in which the recording unit and the stage oppose one another) in comparison to a configuration in which the pair of guide rails and the pair of rail attachment bases are disposed on the surface side of the stage. By being disposed on the rear surface side of the stage, the pair of guide rails and the pair of rail attachment bases do not interfere with the recording performed by the recording unit. Accordingly, it is possible to dispose the pair of guide rails and the pair of rail attachment bases so as to overlap the recording unit and the recording medium.

BRIEF DESCRIPTION OF THE DRAWINGS

The invention will be described with reference to the accompanying drawings, wherein like numbers reference like elements.

FIG. 3 is a front view showing the recording apparatus with a portion of a supporting stage and a portion of an apparatus cover omitted.

FIG. 4 is a cross-sectional view across the line IV-IV showing the supporting stage and the periphery of a Y axis movement unit.

FIG. 8 is a cross-sectional view showing a modification example of a rail attachment base.

DESCRIPTION OF EXEMPLARY EMBODIMENTS

Figure 1:
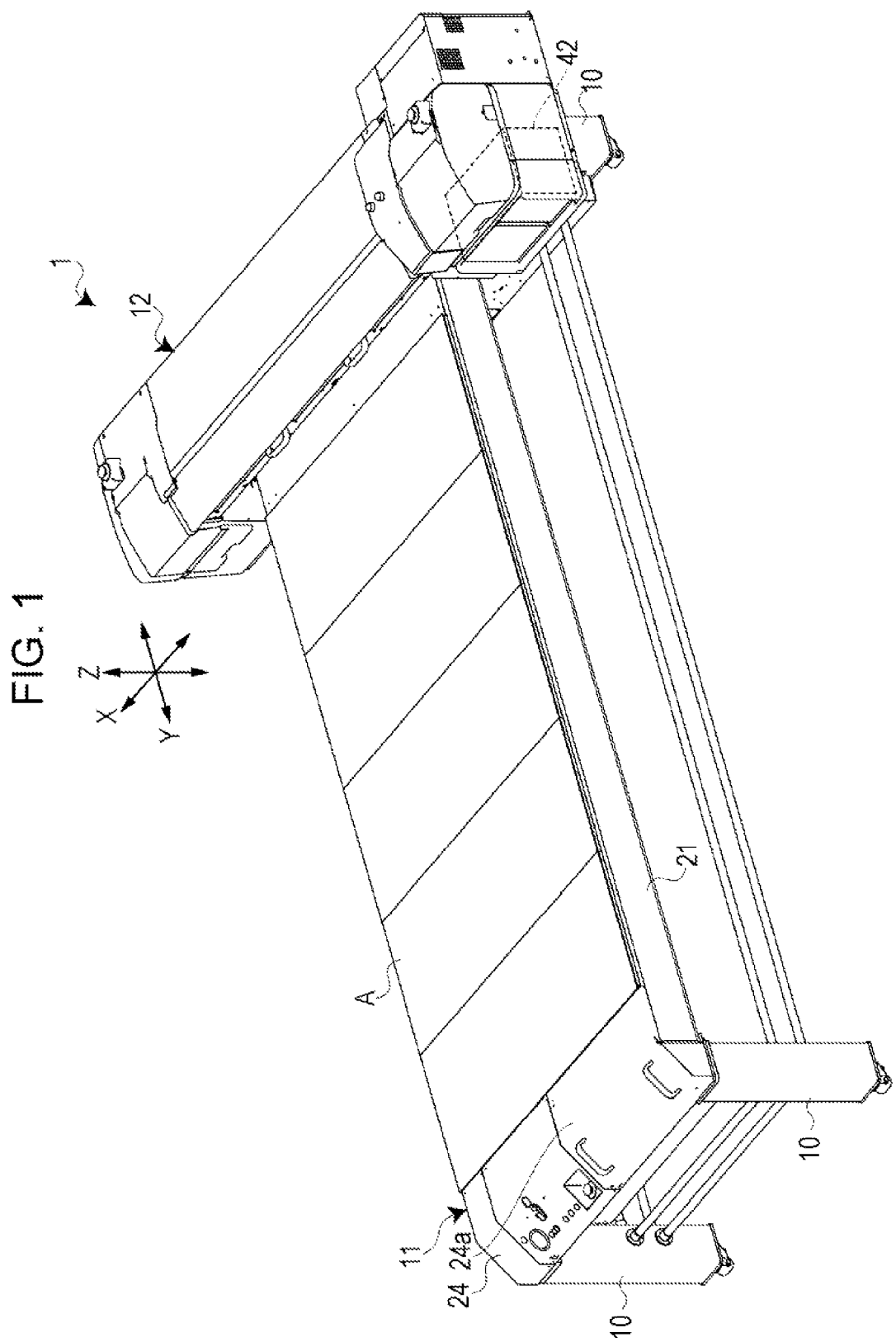
FIG. 1 is an external perspective view showing a recording apparatus according to an embodiment.

Hereinafter, description will be given of the recording apparatus according to an embodiment of the invention with reference to the accompanying drawings. The recording apparatus is a recording apparatus that records a desired image on a recording medium by discharging an ultraviolet curing ink using an ink jet system. Furthermore, the recording apparatus is a so-called flatbed type recording apparatus that performs recording by causing a recording head to move in relation to the recording medium, which is supported by a supporting stage. The recording medium is assumed to be, for example, recording media of different thicknesses such as thick paper, wood, a tile, plastic board, and cardboard. Note that, the X axis (left and right) direction, the Y axis (front and back) direction and the Z axis (up and down) direction are defined as shown in the drawings, and description will be given hereinafter. The Y axis direction and the X axis direction are directions that are parallel to the supporting surface (the setting surface) of the supporting stage. The Y axis direction is perpendicular to the X axis direction, and the Z axis direction is perpendicular to the X axis direction and the Y axis direction. The far side in FIG. 1 will be referred to as a first side in the Y axis direction, and the near side in FIG. 1 will be referred to as a second side in the Y axis direction.

Figure 2A:
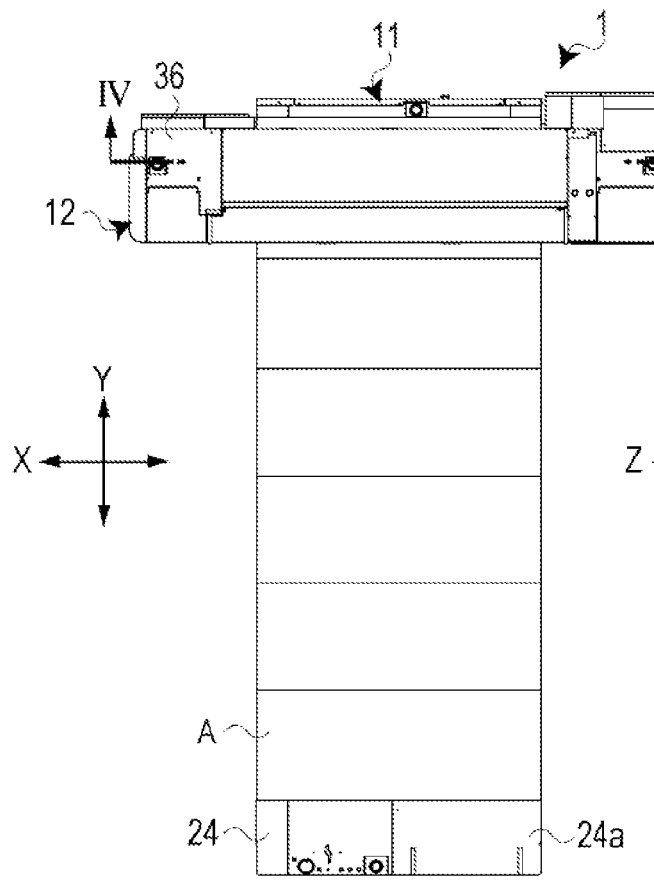
FIGS. 2A to 2C are respectively a plan view, a front view and a side view showing the recording apparatus.
Figure 2C:
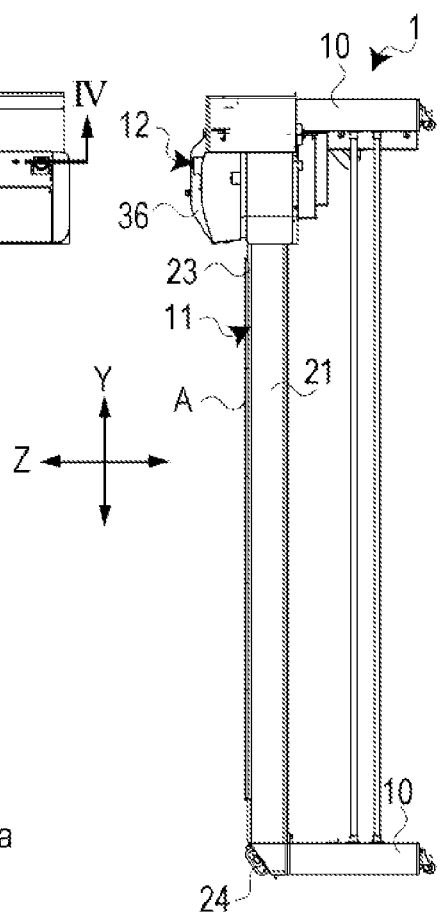
Figure 2B:
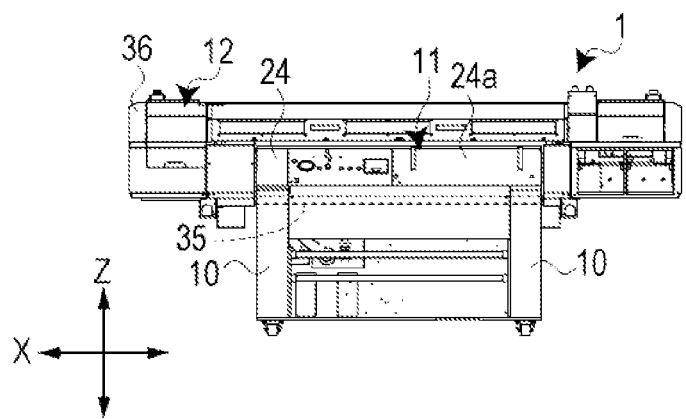

As shown in FIGS. 1 to 3, a recording apparatus 1 is supported by four leg members 10, and is provided with a supporting stage (a stage) 11 that supports a recording medium A, a recording processing unit 12 that includes a recording unit 31 opposing the supported recording medium A, and a Y axis movement unit (a movement unit) 13 that supports the recording processing unit 12 and causes the recording processing unit 12 to move in the Y axis direction (a second direction) in relation to the supporting stage 11. The recording processing unit 12 bridges the X axis direction (a first direction) so as to cross over the supporting stage 11. Meanwhile, the Y axis movement unit 13 is disposed on the rear surface side of the supporting stage (the surface of the opposite side from the recording processing unit 12 side) to overlap the supporting stage 11, and supports the recording processing unit 12 in a freely movable manner on the rear surface side of the supporting stage 11 (described hereinafter in detail).

Next, description will be given of the supporting stage 11 with reference to FIGS. 1, 2A to 2C and 4. FIG. 4 is a cross-sectional view across the line IV-IV of the supporting stage 11 and the periphery of the Y axis movement unit 13 when viewed from the first side in the Y axis direction. As shown in FIGS. 1, 2A to 2C and 4, the supporting stage 11 includes a pair of left and right beam-shaped structural bars 21 that extend in the Y axis direction, a plurality of supporting members 22 that are disposed lengthwise and breadthwise between the pair of structural bars 21, and a suction table 23 that is supported by the pair of structural bars 21 and the plurality of supporting members 22, and on which the recording medium A is set by suction. Each of the end portions of the structural bars 21 are connected to the respective leg members 10 by welding or the like. An operation panel unit 24 is disposed on the end portions of the second side of the supporting stage 11 in the Y axis direction. An opening and closing door 24a is provided over a wide portion of the right half portion of the operation panel unit 24. When manually performing maintenance on the recording processing unit 12, the recording processing unit 12 is caused to move to the near side (the second side in the Y axis direction), the opening and closing door 24a is opened, and the maintenance of the recording processing unit 12 is performed from the opening and closing door 24a.

The suction table 23 includes a table main body 26 that includes a supporting surface that supports the recording medium A, has a large number of suction pores (omitted from the drawings), and a suction chamber 27 provided on the underside of the table main body 26. The suction chamber 27 is connected to a vacuum suction facility (not shown) by a pipe, a duct, or the like. In other words, by driving the vacuum suction facility, the recording medium A that is placed on the table main body 26 is sucked, and the recording medium A is held onto the table main body 26.

The structural bar 21 is configured from a bar, the cross-sectional shape of which is square (a square pipe), and both end portions in the Y axis direction thereof are connected to the respective leg members 10. The upper surface (the surface side) of the structural bar 21 is a table attachment surface, to which the table main body 26 is attached. Rail attachment bases 25a and 25b for attaching guide rails 91 (described hereinafter) are fixed to the respective lower surfaces (the rear surface side) of the structural bars 21.

Figure 5:
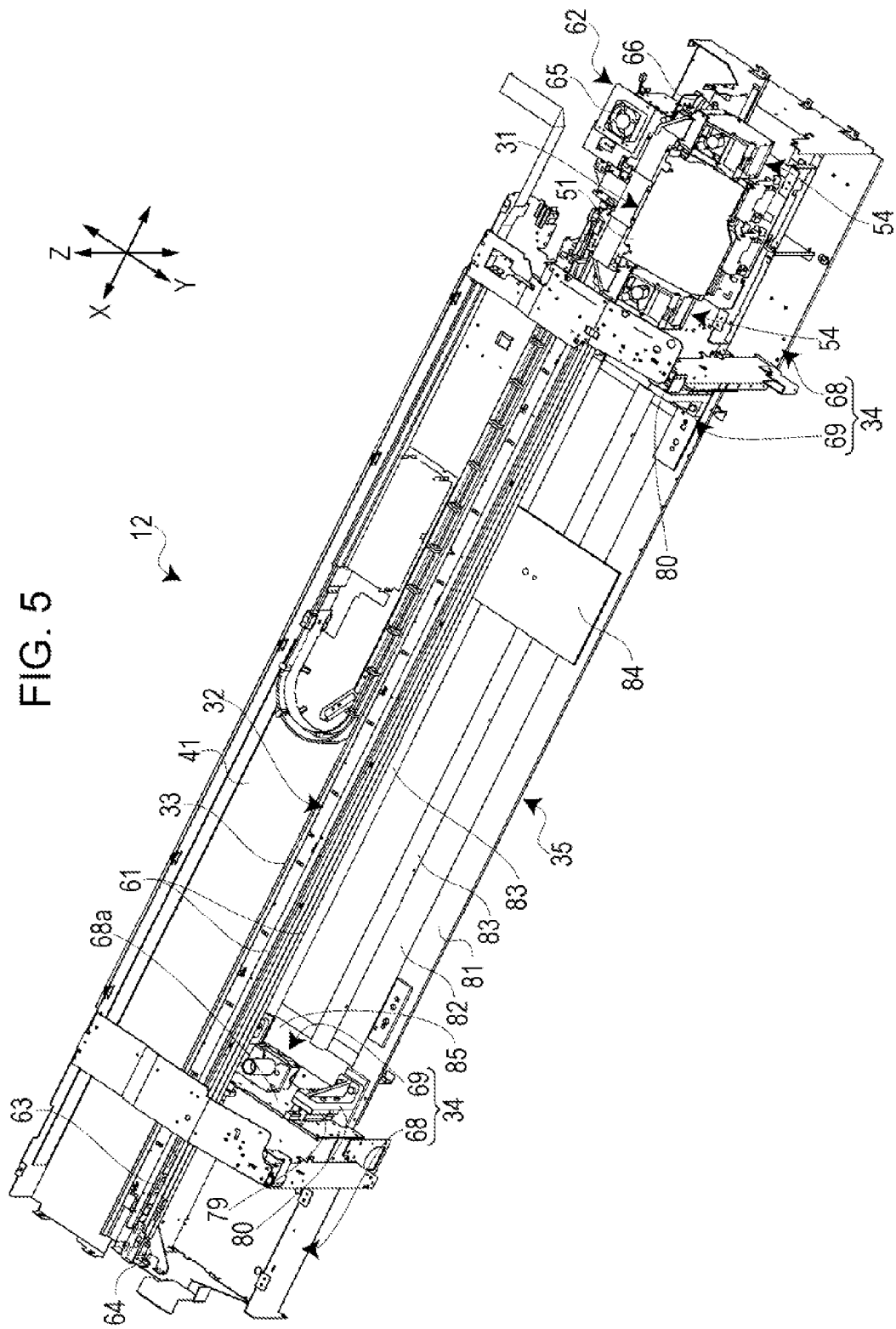
FIG. 5 is a perspective view showing a recording processing unit with the apparatus cover omitted.
Figure 6:
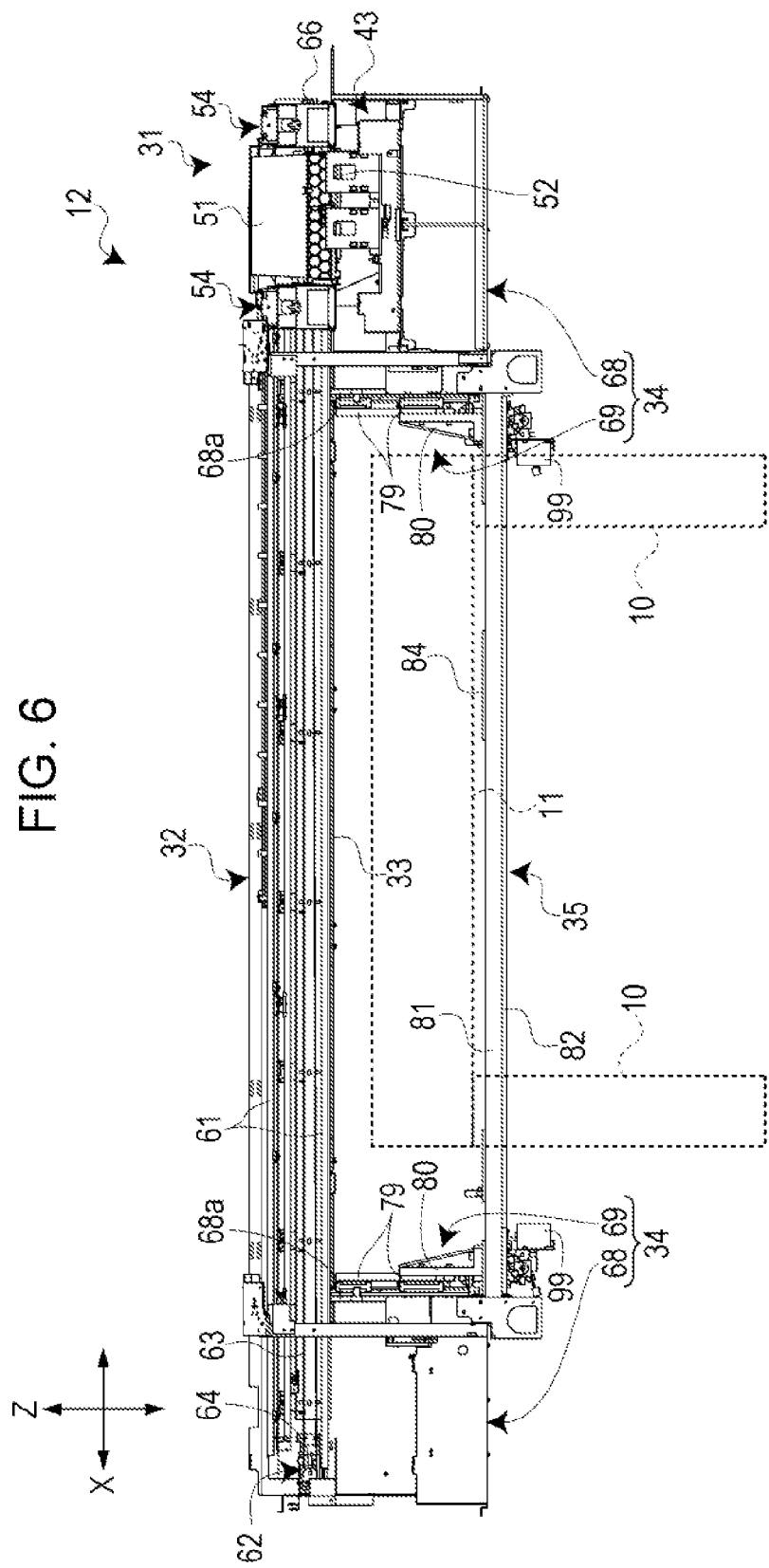
FIG. 6 is a front view showing the recording processing unit with the apparatus cover omitted.

As shown in FIGS. 5 and 6, the recording processing unit 12 is provided with a recording unit 31, an X axis movement unit 32, a horizontal bridging frame 33, a pair of left and right side frames 34, a connecting frame 35, and an apparatus cover (refer to FIG. 1) 36 that covers the above components. The recording unit 31 opposes the supported recording medium A and performs recording on the recording medium A, the X axis movement unit 32 supports the recording unit 31 and causes the recording unit 31 to move in the X axis direction, the horizontal bridging frame 33 supports the X axis movement unit 32, the side frames 34 support the horizontal bridging frame 33 from both sides in the X axis direction (the first side and the second side in the X axis direction), and the connecting frame 35 connects the base portion sides of the pair of side frames 34 to one another. The horizontal bridging frame 33 extends in the X axis direction to cross over the supporting stage 11. Each of the side frames 34 extend downward to below the supporting stage 11, and the connecting frame 35 is connected to the lower end portions of both the side frames 34 further below the supporting stage 11 than the table main body 26.

The supporting stage 11 is bridged by the horizontal bridging frame 33, the pair of side frames 34 and the connecting frame 35; thus configuring a square-shaped (a rectangular-shaped) frame portion that surrounds the supporting stage 11.

The recording processing unit 12 includes a tube holding portion 41, a tank unit (refer to FIG. 1) 42, and a maintenance unit 43. The tube holding portion 41 is disposed on the rear side (the first side) of the horizontal bridging frame 33 in the Y axis direction and holds ink tubes, cables and the like, the tank unit 42 is disposed on the front right and includes ink tanks of various colors, and the maintenance unit 43 is provided in order to maintain and recover the functions of recording heads 52.

The recording unit 31 includes a carriage 51, on which two of the recording heads 52 are mounted, and a pair of ultraviolet radiation units 54, which are provided on both sides in the X axis direction in relation to the carriage 51. Each of the ultraviolet radiation units 54 includes an ultraviolet radiation LED, and causes an ultraviolet curing ink, which is discharged from the recording head 52, to cure (to be fixed) by causing ultraviolet rays to be radiated from the ultraviolet radiation LED.

The recording head 52 is an ink jet head that is driven to discharge by piezoelectric elements (piezo elements), and includes a plurality of nozzle rows (not shown) for each color that extend in the Y axis direction. In other words, the recording head 52 is configured to be capable of discharging plural colors of ultraviolet curing ink. Furthermore, the nozzle surface of the recording head 52 opposes the recording medium A. Note that in this embodiment, a piezo system ink jet head is used; however, the invention it not limited thereto, for example, a thermal system or an electrostatic system ink jet head may also be used. The invention is also not limited to such on-demand types of ink jet head, and a continuous type of ink jet head may also be used.

The X axis movement unit 32 is provided with a pair of upper and lower guide shafts 61, and an X axis drive mechanism 62. The guide shafts 61 are supported by the horizontal bridging frame 33 and support the recording unit 31 to move freely in a reciprocal manner in the X axis direction. The X axis drive mechanism 62 drives the recording unit 31 along the pair of guide shafts 61.

The X axis drive mechanism 62 is provided with a timing belt 63, a drive pulley 66 and a driven pulley 64, a connecting fixing portion (not shown), and a carriage motor 65. The timing belt 63 extends in the X axis direction along the pair of guide shafts 61, and bridges the drive pulley 66 and the driven pulley 64, the connecting fixing portion connects the timing belt 63 with the recording unit 31, and the carriage motor 65 drives the drive pulley 66. In the X axis movement unit 32, the recording unit 31 is caused to move reciprocally in the X axis direction on the pair of guide shafts 61 via the timing belt 63 by causing the carriage motor 65 to rotate forward and backward. The recording process is performed by driving each of the recording heads 52 to discharge together with the reciprocal motion.

Figure 7:
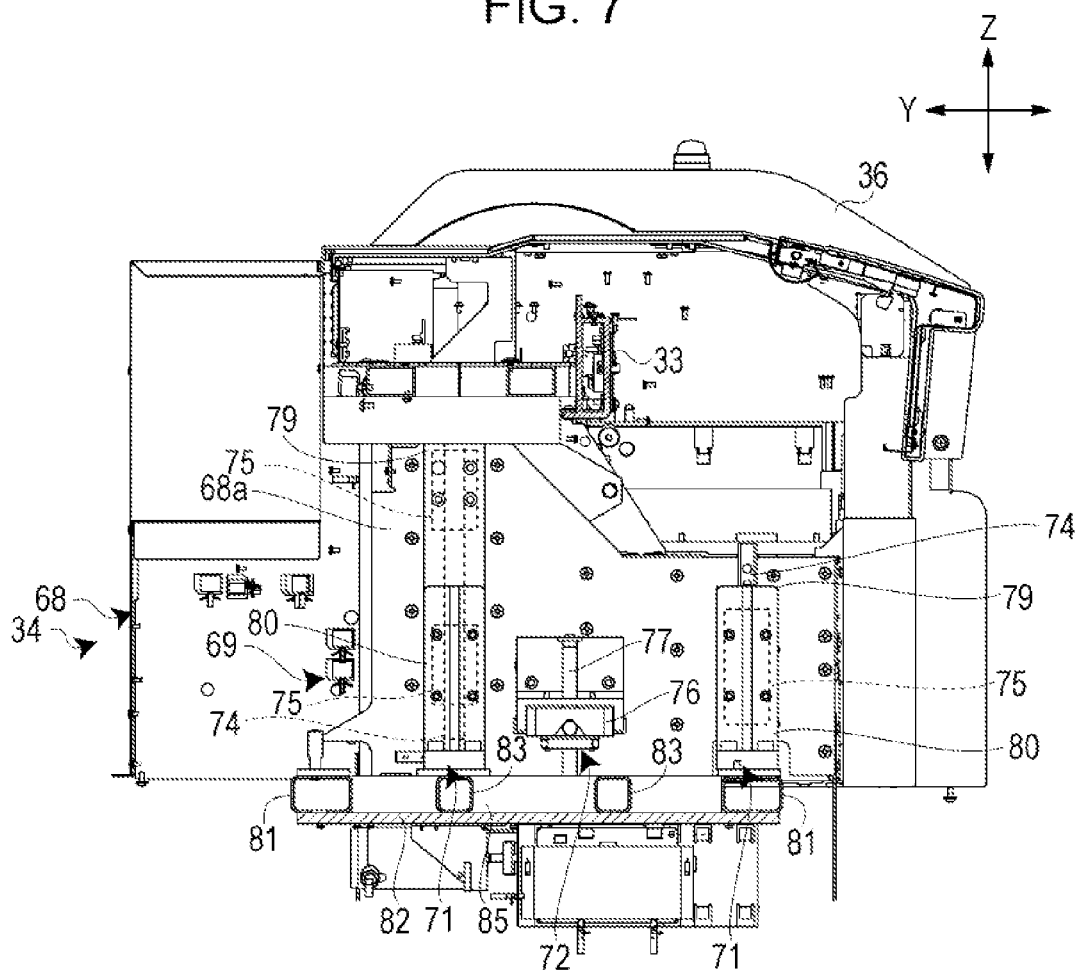
FIG. 7 is an inner side view showing a side frame and the periphery of a raising and lowering movement unit that is retrofitted therein.

Next, description will be given of the side frames 34 with reference to FIGS. 5 to 7. As shown in FIGS. 5 to 7, on each of the side frames 34, there is provided a raising and lowering movement unit 69 that causes the recording unit 31 to move in the vertical direction (the Z axis direction), and causes the recording unit 31 to approach and separate in relation to the supporting stage 11. Specifically, each of the side frames 34 is provided with a box-shaped frame main body 68 that supports the horizontal bridging frame 33, and a raising and lowering movement unit 69 that connects the frame main body 68 and the connecting frame 35 to one another and causes the frame main body 68 to move by being raised or lowered. The recording unit 31 is caused to move by being raised and lowered via the frame main bodies 68, the horizontal bridging frame 33, and the X axis movement unit 32 by causing the frame main bodies 68 to move by being raised and lowered using the raising and lowering movement units 69. Accordingly, the recording unit 31 is caused to approach and separate (gap adjustment) in relation to the supporting stage 11 and the recording medium A that is supported by the supporting stage 11.

The frame main bodies 68 support the horizontal bridging frame 33. Furthermore, the frame main bodies 68 include fixing plate portions 68a, which fix the movable sides of each of the raising and lowering movement units 69, on the center side (the supporting stage 11 side) of the recording apparatus 1.

Each of the raising and lowering movement units 69 is provided with two raising and lowering guide mechanisms 71, a raising and lowering drive mechanism 72, and a raising and lowering drive motor 99. The raising and lowering guide mechanisms 71 support the frame main body 68 to be raised and lowered freely in relation to the connecting frame 35, the raising and lowering drive mechanism 72 is disposed between the two raising and lowering guide mechanisms 71 and causes the frame main body 68 to move in the vertical direction, and the raising and lowering drive motor 99 drives the raising and lowering drive mechanism 72.

The raising and lowering guide mechanism 71 is configured by the LM guide (registered trademark) mechanism, which is formed from a raising and lowering guide rail 74 that is fixed to the fixing plate portions 68a, and a raising and lowering slider 75 that is fixed to the connecting frame 35. Note that the symbols 79 and 80 are a first connecting member and a second connecting member, which connect the raising and lowering slider 75 and the connecting frame 35 to one another.

The raising and lowering drive mechanism 72 is provided with a ball screw mechanism that includes a raising and lowering nut member 76 that is fixed to the fixing plate portion 68a, and a raising and lowering threaded shaft 77 that is fixed to the connecting frame 35. Note that, in this embodiment, a configuration is adopted in which the raising and lowering nut member 76 is fixed, the raising and lowering threaded shaft 77 is caused to move rotationally, and the raising and lowering nut member 76 is caused to move in the vertical direction relative to the raising and lowering guide rail 74. However, a configuration may also be adopted in which the raising and lowering threaded shaft 77 is fixed, the raising and lowering nut member 76 is caused to move rotationally, and the raising and lowering nut member 76 is caused to move in the vertical direction relative to the raising and lowering guide rail 74.

As shown in FIGS. 4 to 6, the connecting frame 35 is disposed on the rear surface side of the supporting stage 11, and, is disposed to overlap a movement region of the recording unit 31 and a placement region of the recording medium A in the X and Y directions. Specifically, the connecting frame 35 is provided with a plurality of rod-shaped frames 81, a plate-shaped frame 82, a plurality of vertical frames 85, a plurality of horizontal frames 83, and an attachment plate 84. The rod-shaped frames 81 bridge the space between the base portion sides of both of the side frames 34. The lower surface side of the plate-shaped frame 82 is fixed to a plurality of the rod-shaped frames 81. The vertical frames 85 connect the rod-shaped frames 81 by both end portions thereof in the X axis direction. The horizontal frames 83 are fixed on the plurality of vertical frames 85 between the plurality of rod-shaped frames 81, and extend parallel to the rod-shaped frames 81. The attachment plate 84 bridges the plurality of rod-shaped frames 81, and a drive motor 88 (described hereinafter) of the Y axis movement unit 13 is attached thereto.

The Y axis movement unit 13 is provided with a pair of linear guide mechanisms 86, a Y axis movement mechanism (a drive unit) 87, the drive motor 88, and a pair of rail attachment bases 25a and 25b. The linear guide mechanisms 86 are positioned on both sides on the left and right of the rear surface side of the supporting stage 11, and cause the recording processing unit 12 to slide in the Y axis direction in relation to the supporting stage 11. The Y axis movement mechanism 87 is positioned on the center of the rear surface side of the supporting stage 11, and causes the recording processing unit 12 to move in the Y axis direction in relation to the supporting stage 11. The drive motor 88 drives the Y axis movement mechanism 87. The rail attachment bases 25a and 25b are fixed to the rear surface side of the supporting stage 11, and the guide rails 91 of each of the linear guide mechanisms 86 are attached thereto. The pair of linear guide mechanisms 86 are disposed to be separated from one another in the X axis direction, and the Y axis movement mechanism 87 is disposed between the pair of linear guide mechanisms 86 in the X axis direction.

The linear guide mechanisms 86 are configured by the LM guide mechanism. The linear guide mechanisms 86 include the guide rails 91, which are fixed to each of the rail attachment bases 25a and 25b, and extend in the Y axis direction, and sliders 92, which are fixed to the plate-shaped frame 82 of the connecting frame 35 and move on the guide rails 91 in a free sliding manner. The pair of guide rails 91 of the pair of linear guide mechanisms 86 is configured from a guide rail 91a of the reference side, which is used as a reference during attachment, and a guide rail 91b of a following side that corresponds to the reference side. The guide rail 91a of the reference side is attached to the side at which the distributed load of the recording processing unit 12 is great, that is, the right side (the left side in FIG. 4) where the tank unit 42 is present; whereas, the guide rail 91b of the following side is attached to the left side (the right side in FIG. 4).

The pair of rail attachment bases 25a and 25b are configured by the first rail attachment base 25a and the second rail attachment base 25b. The first rail attachment base 25a of the right side is fixed to the structural bar 21 of the right side (the left side in FIG. 4), and the guide rail 91a of the reference side is attached thereto. Meanwhile, the second rail attachment base 25b of the left side is fixed to the structural bar 21 of the left side of the recording apparatus 1 (the right side in FIG. 4), and the guide rail 91b of the following side is attached thereto. In this manner, the pair of rail attachment bases 25a and 25b are provided to be separated from one another in the X axis direction. The second rail attachment base 25b includes an attachment surface portion 93 that includes a rail attachment surface (a second attachment surface) 93a onto which the guide rail 91b of the following side is attached.

On the other hand, the first rail attachment base 25a is provided with the attachment surface portion 93, which includes the rail attachment surface (a first attachment surface) 93a to which the guide rail 91a of the reference side is attached, and an attachment reference portion (a reinforcement portion) 94, which is continuous in the X axis direction in relation to the attachment surface portion 93 and has a thickness that protrudes downward from the rail attachment surface 93a. The first rail attachment base 25a is configured such that, in the X axis direction, the attachment surface portion 93 is fixed to the outside of the supporting stage 11, and the attachment reference portion 94 is fixed to the inside of the supporting stage 11. Accordingly, the attachment surface portion 93 (the rail attachment surface 93a) of the first rail attachment base 25a is disposed in a position in the X axis direction that is separated further from the Y axis movement mechanism 87 than the attachment reference portion 94. Since the first rail attachment base 25a is disposed on the right side, on which the distributed load of the recording processing unit 12 is great, the load that the first rail attachment base 25a receives from the recording processing unit 12 is greater than that received by the second rail attachment base 25b.

An attachment reference surface 94a, which is the side surface attachment reference of the guide rail 91a of the reference side, is formed on the side surface of the rail attachment surface 93a side of the attachment reference portion 94. Furthermore, the attachment reference portion 94 strengthens the rigidity of the structural bar 21 due to the thickness and the width of the attachment reference portion 94. In other words, the structural bar 21 of the right side, where the distributed load of the recording processing unit 12 is great, is strengthened. Due to this strengthening, the configuration is such that the amount of deflection, caused by the distributed load of the recording processing unit 12, of the pair of structural bars 21 is the same. Accordingly, the amount of deflection, caused by the load from the recording processing unit 12, of the supporting stage 11 is the same between the first rail attachment base 25a side and the second rail attachment base 25b side.

The Y axis movement mechanism 87 is mounted on the connecting frame 35, and is configured by a ball screw mechanism. The Y axis movement mechanism 87 includes a threaded shaft 96, which is fixed to the supporting stage 11 and extends in the Y axis direction, and a nut member 98, which is fixed to the plate-shaped frame 82 of the connecting frame 35 via a supporting member 97 to rotate freely and screws onto the threaded shaft 96. The (axis center of the) Y axis movement mechanism 87 is disposed between the surface (a supporting surface) of the supporting stage 11 and the linear guide mechanisms 86 in the vertical direction (the direction in which the recording unit 31 and the supporting stage 11 oppose one another). In the Y axis movement unit 13, the nut member 98 is caused to move in the Y axis direction relative to the threaded shaft 96 along a thread groove that is formed in the threaded shaft 96 by using the drive motor 88 to drive (rotate) the nut member 98. In this manner, the recording processing unit 12 is caused to move in the Y axis direction along the linear guide mechanisms 86 using the Y axis movement unit 13. In other words, the Y axis movement unit 13 causes the recording unit 31 to move in the Y axis direction via the frame portion (the horizontal bridging frame 33, the side frame 34, and the connecting frame 35). Note that, in this embodiment, a configuration is adopted in which the threaded shaft 96 is fixed and the nut member 98 is driven to rotate; however, a configuration may also be adopted in which the nut member 98 is fixed and the threaded shaft 96 is driven to rotate. By extension, a configuration may also be adopted in which the nut member 98 is caused to move in the Y axis direction relative to the threaded shaft 96 by driving both the nut member 98 and the threaded shaft 96 to rotate.

In this embodiment, the rotating side and the fixed side of the raising and lowering drive mechanism 72 and the Y axis movement mechanism 87 are the reverse of one another with respect to the nut member (the raising and lowering nut member 76 and the nut member 98) and the threaded shaft (the raising and lowering threaded shaft 77 and the threaded shaft 96); however, these may also be the same. In other words, there is conceived to be a pattern in which the raising and lowering threaded shaft 77 and the nut member 98 are the rotating side, and the raising and lowering nut member 76 and the threaded shaft 96 are the fixed side (this embodiment), a pattern in which the raising and lowering nut member 76 and the threaded shaft 96 are the rotating side, and the raising and lowering threaded shaft 77 and the nut member 98 are the fixed side, a pattern in which the raising and lowering threaded shaft 77 and the threaded shaft 96 are the rotating side, and the raising and lowering nut member 76 and the nut member 98 are the fixed side, and a pattern in which the raising and lowering nut member 76 and the nut member 98 are the rotating side, and the raising and lowering threaded shaft 77 and the threaded shaft 96 are the fixed side.

In the recording operation of the recording apparatus 1, the recording unit 31 is caused to be raised or lowered to a predetermined gap position in relation to the recording surface of the recording medium A by the raising and lowering movement units 69; and, subsequently, the recording processing unit 12 is caused to move intermittently from the second side to the first side in the Y axis direction by the Y axis movement unit 13 (line feed). During each pause in the intermittent movement of the recording processing unit 12 in the Y axis direction, the recording unit 31 is caused to move in the X axis direction using the X axis movement unit 32, and the recording head 52 is driven to discharge (recording process). Accordingly, a desired image is recorded on the recording medium A.

According to the configuration described above, by providing the thick attachment reference portion 94 on the rail attachment base (the first rail attachment base 25a) of the side at which the load (the distributed load) of the recording processing unit 12 is great, the rigidity (the second moment of area) of the structural bar 21, to which the rail attachment base 25a is fixed, is reinforced. In other words, since it is possible to increase the rigidity of the structural bar 21 of the side at which the distributed load is great using the attachment reference portion 94, it is possible to suppress the amount of deflection of the structural bar 21 of the side at which the distributed load is great. Accordingly, it is possible to suppress the difference in the amount of deflection of the left and right structural bars 21 with a simple configuration, using the left and right structural bars 21 that are the same as one another. In other words, in the supporting stage 11, it is possible to suppress the amount of deflection of the side at which the distributed load is great; thus, it is possible to suppress the inclination of the recording processing unit 12, and to improve the recording accuracy of the recording unit 31.

It is also possible to configure a reinforcement portion that acts effectively as the second moment of area (improves the rigidity) by using a step portion, which is the attachment reference surface 94a, by forming the attachment reference surface 94a on the side surface of the attachment reference portion 94. It is not necessary to provide the reinforcement portion and the attachment reference portion 94 separately, and it is possible to adopt a simple configuration for the first rail attachment base 25a.

The attachment reference portion 94 is formed at a thickness or a width, or both, such that the amount of deflection of the pair of structural bars 21 caused by the distributed load is the same; thus, it is possible to set the difference in the amount of deflection of the pair of structural bars 21 to zero. In other words, in regard to the supporting stage 11, it is possible to set the difference in the amount of deflection between the first rail attachment base 25a side and the second rail attachment base 25b side to zero.

In addition, by disposing the attachment surface portion 93 (the rail attachment surface 93a) to be further separated from the Y axis movement mechanism 87 than the attachment reference portion 94 in the X axis direction, it is possible to dispose the guide rail 91a of the reference side in a position that is as distanced from the Y axis movement mechanism 87 as possible. It is possible to dispose the guide rail 91a of the reference side as close to the outside of the supporting stage 11 in the X axis direction as possible. Accordingly, it is possible to improve the movement accuracy of the recording unit 31.

The pair of guide rails 91 and the pair of rail attachment bases 25a and 25b are disposed on the rear surface side of the supporting stage 11; thus, it is possible to reduce the height dimension of the entire recording apparatus 1 (the dimension of the direction in which the recording unit 31 and the supporting stage 11 oppose one another) in comparison to a configuration in which the pair of guide rails 91 and the pair of rail attachment bases 25a and 25b are disposed on the surface side of the supporting stage 11. By being disposed on the rear surface side of the supporting stage 11, the pair of guide rails 91 and the pair of rail attachment bases 25a and 25b do not interfere with the recording performed by the recording unit 31. Accordingly, it is possible to dispose the pair of guide rails 91 and the pair of rail attachment bases 25a and 25b so as to overlap the movement region of the recording unit 31 and the placement region of the recording medium A in the X and Y directions.

In this embodiment, the attachment reference portion 94 is set to a thickness of a degree that does not interfere with the slider 92 in relation to the guide rail 91a of the reference side; however, as shown in FIG. 8, a configuration may also be adopted in which the thickness of the attachment reference portion 94 is increased, and a notch portion 94b is formed that is cut out of the attachment reference portion 94 so as to avoid the slider 92. In this case, it is possible to avoid interference between the attachment reference portion 94 and the slider 92 while the attachment reference portion 94 maintains a sufficient thickness.

In this embodiment, a configuration is adopted in which the attachment reference portion 94 that includes the attachment reference surface 94a is caused to also function as the reinforcement portion that reinforces the structural bar 21; however, a configuration may also be adopted in which the attachment reference surface 94a is not formed on the attachment reference portion 94, and the attachment reference portion 94 is caused to function only as the reinforcement portion.

In this embodiment, a configuration is adopted in which, of the pair of rail attachment bases 25a and 25b, only the first rail attachment base 25a of the right side is provided with the attachment reference portion 94; however, when the distributed load of the recording processing unit 12 is greater on the left side, a configuration may be adopted in which only the second rail attachment base 25b of the left side is provided with the attachment reference portion 94. In this case, to accommodate this configuration, the guide rail 91a of the reference side is attached to the second rail attachment base 25b, and the guide rail 91b of the following side is attached to the first rail attachment base 25a.

Furthermore, in this embodiment, a configuration is adopted in which the pair of guide rails 91 and the pair of rail attachment bases 25a and 25b are disposed on the rear surface side of the supporting stage 11; however, a configuration may also be adopted in which these are disposed on the lateral sides of the supporting stage 11, and, a configuration may also be adopted in which these are disposed on the surface side of the supporting stage 11.

In this embodiment, an LM guide mechanism (a linear ball guide mechanism) is used as the linear guide mechanism 86; however, a sliding guide mechanism, or the like, for example, may also be used as the linear guide mechanism 86.

In this embodiment, the invention is applied to the recording apparatus 1 in which recording is performed by moving the recording unit 31 in the X and Y directions; however, a configuration may also be adopted in which the invention is applied to the recording apparatus 1 in which recording is performed by moving the recording unit 31 that includes a line head in only the Y axis direction (a so-called line printer).

Note that, in this embodiment, the X axis direction is the so-called main scanning direction, and the Y axis direction is the so-called sub-scanning direction.

The entire disclosure of Japanese Patent Application No. 2013-063312, filed Mar. 26, 2013 is expressly incorporated by reference herein.

What is claimed is:

1. A recording apparatus, comprising:
a stage, which includes a supporting surface that supports a recording medium;
a recording processing unit, which includes a recording unit that performs recording on the supported recording medium, and bridges a first direction so as to cross the stage; and
a movement unit, which causes the recording processing unit to move in relation to the stage in a second direction that is perpendicular to the first direction and is parallel to the supporting surface,
wherein the movement unit includes
a first guide rail, which supports the recording processing unit to be free sliding in the second direction in relation to the stage;
a second guide rail, which is provided separated from the first guide rail in the first direction, and supports the recording processing unit to be free sliding in the second direction in relation to the stage;
a first rail attachment base, which includes a first attachment surface to which the first guide rail is attached, and is fixed to the stage; and
a second rail attachment base, which includes a second attachment surface to which the second guide rail is attached, and is fixed to the stage,
wherein the first rail attachment base includes a reinforcement portion of a thickness that protrudes from the first attachment surface, and the load that the first rail attachment base receives from the recording processing unit is greater than that received by the second rail attachment base.

2. The recording apparatus according to claim 1,
wherein an attachment reference surface, which is a side surface attachment reference of the first guide rail, is formed on a side surface of the first attachment surface side of the reinforcement portion.

3. The recording apparatus according to claim 2,
wherein the first guide rail is the guide rail of a reference side, and
wherein the second guide rail is the guide rail of a following side.

4. The recording apparatus according to claim 1,
wherein the reinforcement portion is formed at a thickness or a width, or both, such that the amount of deflection of the stage caused by the load is the same at the first rail attachment base side and the second rail attachment base side.

5. The recording apparatus according to claim 1,
wherein a notch portion is formed that is cut out of the reinforcement portion so as to avoid a slider that corresponds to the first guide rail.

6. The recording apparatus according to claim 1,
wherein the movement unit further includes a drive unit that causes the recording processing unit to move in the second direction in relation to the stage, and
wherein the first attachment surface of the first rail attachment base is disposed in a position in the first direction that is separated further from the drive unit than the reinforcement portion.

7. The recording apparatus according to claim 1,
wherein the first guide rail, the second guide rail, the first rail attachment base, and the second rail attachment base are disposed on a rear surface side of the stage.

* * * * *